(12) United States Patent
Oriet et al.

(10) Patent No.: US 8,151,556 B2
(45) Date of Patent: Apr. 10, 2012

(54) INTERNAL COMBUSTION ENGINE EXHAUST AFTER-TREATMENT SYSTEM AND METHOD

(75) Inventors: Leo P. Oriet, Rochester Hills, MI (US); Nouri Matar, Scarborough (CA)

(73) Assignee: Navistar Canada, Inc. (CA)

( * ) Notice: Subject to any disclaimer, the term of this patent is extended or adjusted under 35 U.S.C. 154(b) by 321 days.

(21) Appl. No.: 12/506,466

(22) Filed: Jul. 21, 2009

(65) Prior Publication Data
US 2011/0016851 A1    Jan. 27, 2011

(51) Int. Cl.
*F01N 3/00* (2006.01)
*F01N 3/10* (2006.01)

(52) U.S. Cl. ............... 60/286; 60/295; 60/297; 60/301

(58) Field of Classification Search ............... 60/295, 60/286, 297, 301
See application file for complete search history.

(56) References Cited

U.S. PATENT DOCUMENTS

| | | | |
|---|---|---|---|
| 3,996,740 A | 12/1976 | Niebylski | |
| 6,074,619 A | 6/2000 | Schoubye | |
| 6,843,054 B2 | 1/2005 | Taylor, III | |
| 6,946,107 B2 | 9/2005 | Carlborg | |
| 7,063,642 B1 * | 6/2006 | Hu et al. | 477/100 |
| 7,127,884 B2 | 10/2006 | Worner | |
| 2003/0209011 A1 | 11/2003 | Duvinage et al. | |
| 2004/0098978 A1 | 5/2004 | Tarabulski et al. | |
| 2005/0106085 A1 | 5/2005 | Calvo | |
| 2007/0044456 A1 * | 3/2007 | Upadhyay et al. | 60/295 |
| 2007/0295003 A1 * | 12/2007 | Dingle et al. | 60/301 |
| 2008/0034744 A1 | 2/2008 | Bardon | |
| 2008/0193353 A1 * | 8/2008 | Hirschberg | 423/239.1 |

OTHER PUBLICATIONS

International Search Report and Written Opinion from corresponding application, PCT/US2010/039737, dated Jun. 24, 2010.

* cited by examiner

*Primary Examiner* — Thomas Denion
*Assistant Examiner* — Michael Carton
(74) *Attorney, Agent, or Firm* — Jeffrey P. Calfa; Mark C. Bach

(57) ABSTRACT

Embodiments described herein relate to internal combustion engine exhaust after-treatment systems and to methods of treating exhaust of an internal combustion engine.

19 Claims, 2 Drawing Sheets

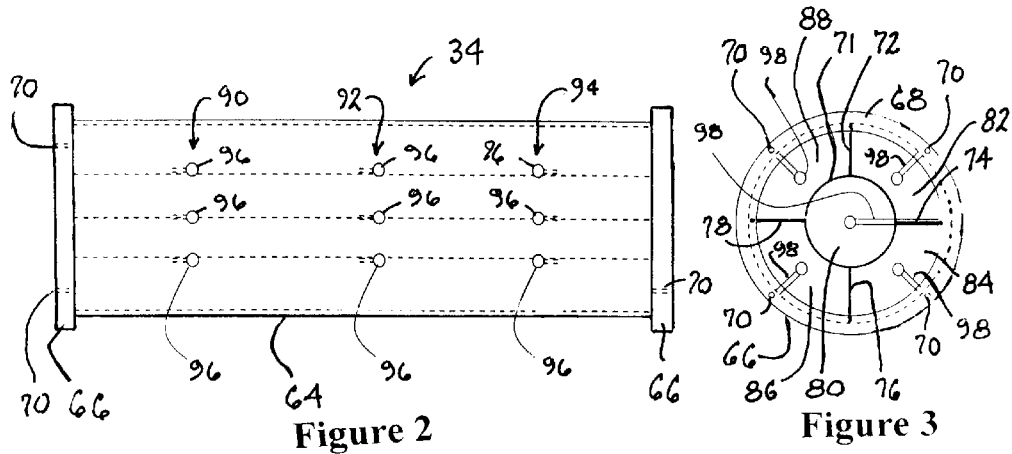
Figure 2
Figure 3
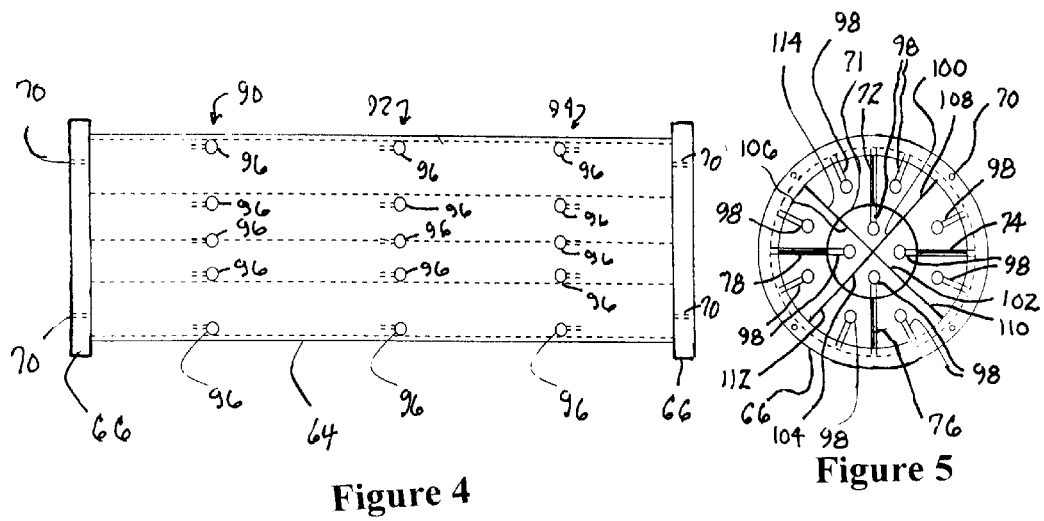
Figure 4
Figure 5

INTERNAL COMBUSTION ENGINE EXHAUST AFTER-TREATMENT SYSTEM AND METHOD

TECHNICAL FIELD

This disclosure relates to internal combustion engines, especially diesel engines like those used to propel trucks, busses, motor coaches and similar large vehicles. In particular the disclosure relates to the treatment of diesel engine exhaust (sometimes referred to simply as after-treatment or exhaust after-treatment) by selective catalytic reduction (SCR) using urea injection upstream of an SCR catalyst.

BACKGROUND

Combustion processes that occur within internal diesel combustion engines create exhaust gases that contain nitric oxides, or NOx, an exhaust gas constituent that is the subject of certain governmental regulations.

One known process for reducing the nitric oxides content in engine exhaust is SCR. SCR involves chemical reaction, promoted by a suitable catalytic system, between nitric oxides present in the exhaust and a reductant that is introduced into the after-treatment system specifically as a reducing agent. It is known to introduce reductant as an aqueous urea solution that is able to release ammonia by hydrolysis under suitable temperature conditions or due to the action of specific catalysts directly into the exhaust gas stream upstream of an SCR catalyst. The introduction of urea solution may be closed-loop controlled by a processor that analyzes relevant data, such as backpressure, NOx, temperature, and ammonia leakage collected from corresponding sensors, and causes dosing apparatus to meter the solution based on results of the analysis.

The urea solution may be introduced by any of various methods, such as by nebulization in which the liquid is mixed with pressurized air and the mixture is allowed to expand into the exhaust stream, or by injection using a specific injection device, or injector, to flow the liquid at a certain pressure through a nozzle or valve into the exhaust stream without the use of air. The latter method, unlike the former, doesn't seem to promote the unwanted precipitation of solids out of solution. Nebulizing systems also tend to be less cost-effective, and more functionally complex, than injection systems.

On the other hand, an airless process may not disperse the liquid within the exhaust stream as well as one that is air-assisted. To improve dispersion in an airless process, a static mixer may be employed upstream of the SCR catalyst but the extent of improvement may be limited. Furthermore, the inclusion of such a device makes a usually unwanted contribution to system backpressure. Some static mixers impart tangential velocity components to the exhaust with respect to the exhaust flow axis and those components tend to promote concentration around the outer margin of the flow stream which can propagate downstream even as far as the SCR catalyst.

Non-uniform dispersion and incomplete dissolving of solution within the exhaust flow stream are known to impair efficiency of chemical and catalytic processes, and consequently, should be avoided in a commercial product.

SUMMARY

Embodiments described herein relate to internal combustion engine exhaust after-treatment systems and to methods of treating exhaust of an internal combustion engine. According to one embodiment, an internal combustion engine comprises an exhaust system through which exhaust gas created by combustion in engine combustion chambers passes to atmosphere and an after-treatment system that treats the exhaust gas before the exhaust gas leaves the exhaust system. The after-treatment system comprises an exhaust flow path having an entrance through which exhaust gas enters the after-treatment system and an exit through which exhaust gas exits the after-treatment system. An SCR catalyst is disposed in the flow path. A partition wall structure is disposed in the flow path upstream of the SCR catalyst for causing exhaust gas flowing toward the SCR catalyst to separate into multiple detached exhaust gas flow streams. One or more ports via which data for one or more characteristics of each detached exhaust gas flow stream can be obtained, and a port through which reductant can be introduced into each detached exhaust gas flow stream are included.

Another embodiment provides an engine exhaust after-treatment device for reducing NOx content in engine exhaust. The device comprises an exhaust flow path having an entrance through which exhaust gas enters the device and an exit through which exhaust gas exits the device. An SCR catalyst is disposed in the flow path. A partition wall structure is disposed in the flow path upstream of the SCR catalyst for causing exhaust gas flowing toward the SCR catalyst to separate into multiple detached flow streams. One or more ports via which data about one or more characteristics of each detached exhaust gas flow stream can be obtained, and a port through which reductant can be introduced into each detached exhaust gas flow stream are included.

A further embodiment provides a method for treating exhaust gas flowing through an exhaust system of an internal combustion engine. In one embodiment, the method comprises causing exhaust gas flowing toward an SCR catalyst to separate into multiple detached exhaust gas flow streams. Data for one or more characteristics of each detached exhaust gas flow stream is obtained. Introduction of reductant into each detached exhaust gas flow stream is controlled using the data.

BRIEF DESCRIPTION OF THE DRAWINGS

FIG. 2 is a side view of a portion of the after-treatment system of FIG. 1.
FIG. 3 is an axial end view of FIG. 2.
FIG. 4 is a view similar to FIG. 2 showing a modified form.
FIG. 5 is an axial end view of FIG. 4.

DETAILED DESCRIPTION

Figure 1:
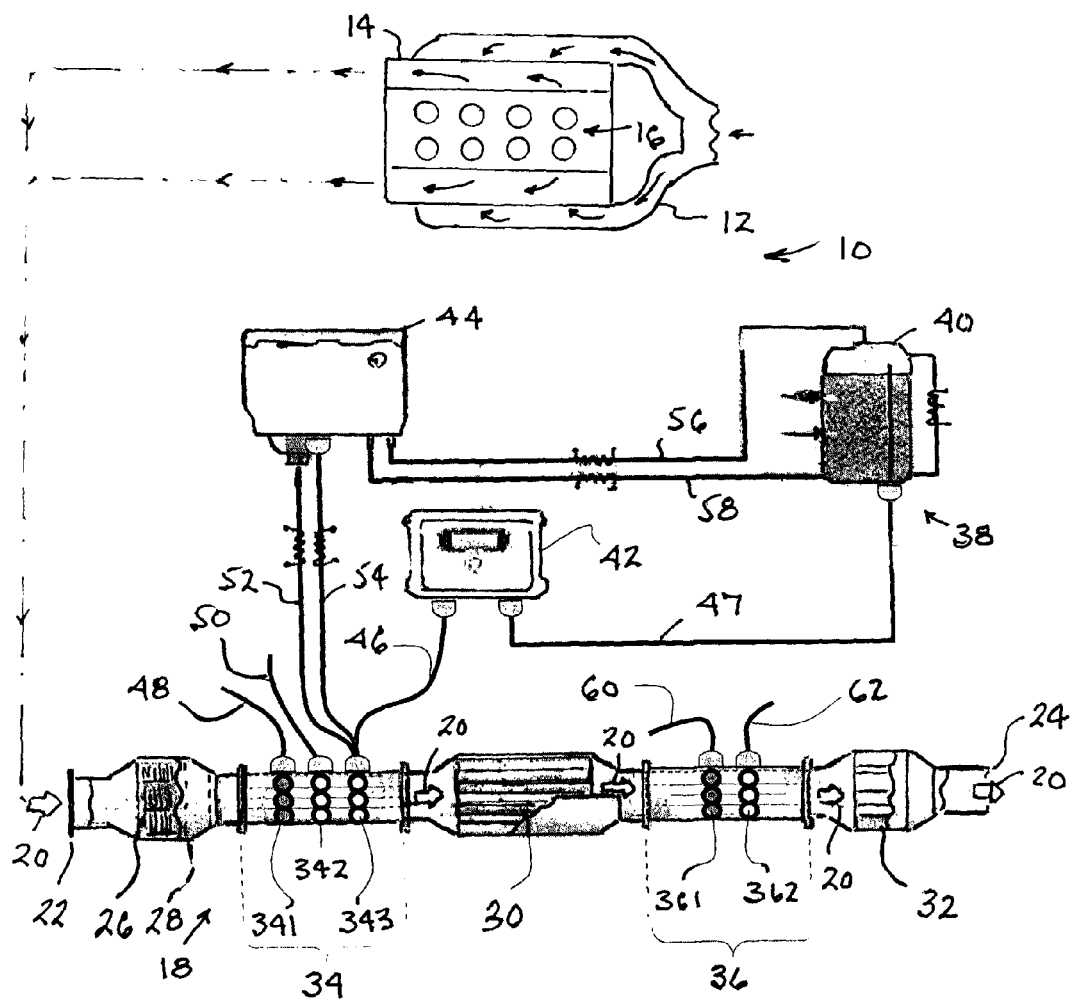
FIG. 1 is a generally schematic diagram showing a diesel engine that includes an exhaust after-treatment system.

FIG. 1 shows an example of a turbocharged diesel engine 10 having an intake system 12 through which charge air enters and an exhaust system 14 through which exhaust gas resulting from combustion exits, not all details of those two systems that are typically present being shown. Engine 10 is shown in the drawing by way of example as an eight-cylinder version in which cylinders 16 form combustion chambers into which fuel is injected by fuel injectors (not shown) to combust with the charge air that has entered through intake system 12. Energy released by combustion powers the engine via pistons connected to a crankshaft.

When used in a motor vehicle, such as a truck, engine 10 is coupled through a drivetrain to driven wheels that propel the vehicle. Intake valves control the admission of charge air into cylinders 16, and exhaust valves control the outflow of exhaust gas through exhaust system 14 and ultimately to atmosphere. Before entering the atmosphere however, the exhaust gas is treated by an after-treatment system 18.

After-treatment system 18 comprises several treatment devices in axial succession forming an exhaust treatment flow path 20 having an entrance 22 at which engine exhaust gas that is to be treated enters flow path 20 and an exit 24 through which exhaust gas that has been treated by system 18 exits flow path 20.

The first treatment device comprises a housing containing a diesel oxidation catalyst (DOC) 26 followed by a diesel particulate filter (DPF) 28 through which exhaust gas flow that enters entrance 22 is constrained to pass. DOC 26 oxidizes hydrocarbons and the soluble organic fraction of diesel soot and can accomplish any of several purposes including compliance with tailpipe emission regulations, increasing exhaust gas temperature for DPF regeneration, SCR catalyst preheating, and oxidizing NO into $NO_2$ in order to a) promote $NO_2$-induced soot oxidation and b) create a NO-to-$NO_2$ ratio favorable for SCR catalyst reaction. DPF 28 traps particulate matter.

The second treatment device comprises a housing containing an SCR catalyst 30 for catalytic reaction of reductant and nitric oxides to reduce the nitric oxides content in exhaust gas.

The third treatment device comprises a housing containing a slip catalyst 32 for reducing the content of any excess reducant that may be present in exhaust gas passing through it before leaving exit 24 and flowing through one or more tail pipes into the atmosphere.

Exhaust gas that has been treated by the first device is conveyed to the second device through a tubular-walled assembly 34 that contains several arrays 341, 342, 343 in axial succession and will be more fully described later with reference to FIGS. 2-5.

After its treatment by the second device, exhaust gas is conveyed to the third device through a tubular-walled assembly 36 that contains arrays 361, 362 in axial succession and will also be more fully described later.

FIG. 1 further shows a reductant system 38 comprising a supply tank 40, a dosing control unit 42, and a processor 44. Tank 40 holds a supply of urea solution that is delivered by dosing control unit 42 to after-treatment system 18 with processor 44 providing control over the quantity of solution introduced into after-treatment system 18. A conduit 46 carries the urea solution from control unit 42 to array 343, and a conduit 47 keeps unit 42 supplied with solution from tank 40.

Electric cables 48, 50, 52, 54 are associated with the arrays of assembly 34. Cables 52, 54 have connections to processor 44 in reductant system 38, which further includes electric cables 56, 58 that connect processor 44 and tank 40. Electric cables 60, 62 are associated with the arrays of assembly 36. As will be more fully explained later, cables 48, 50, 60, 62 also have connections to processor 44 although actual connections are not apparent in FIG. 1.

Detail of assembly 34 that is presented in FIGS. 2 and 3 shows a tubular wall 64 of circular cross section that is open at opposite axial ends to which circular annular mounting rings 66 are joined to provide attachment flanges 68 containing threaded through-holes 70 that allow respective axial ends of assembly 34 to be attached to the respective housings of the first and second treatment devices by fasteners (not shown). Seals that are also not shown are disposed between end faces of rings 66 and mating surfaces of the respective treatment device housings to prevent leakage through those joints.

The cylindrical space bounded by wall 64 is partitioned by a partition wall structure to create multiple independent parallel channels running lengthwise through assembly 34. In this embodiment the partition structure comprises a closed cylindrical wall 71 of circular cross section concentric with wall 64, and four planar walls 72, 74, 76, 78 extending between walls 64 and 71 at 90° intervals about the common axis of walls 64 and 71. Consequently this embodiment comprises five independent lengthwise channels 80, 82, 84, 86, 88 with channel 80 having a circular cross section while the others have substantially identical arcuate cross sections whose circumferential extents are substantially 90° each. Channel 80 has substantially the same transverse cross sectional area along its length as each of the other four.

Wall 64 contains three sets 90, 92, 94 of five through-openings 96 each. Each set accommodates a respective one of the three arrays 341, 342, 343.

Each array comprises a set of five tubes 98. An outer end of each tube 98 has sealed communication with a respective through-opening 96. The tubes of array 341 have inner ends each disposed within a respective channel 80, 82, 84, 86, 88 and facing toward entering exhaust gas flow. So do the tubes of array 342 which are spaced downstream of the tubes of array 341. While the inner ends of the tubes of array 343 are also each disposed within a respective channel 80, 82, 84, 86, 88, they however face away from entering exhaust gas flow.

The open inner ends of the three tubes 98 that are within channel 80 are disposed on the common axis of walls 64 and 71, and wall 71 has three through-openings through which each of those three tubes can pass in a sealed manner. The open inner ends of the remaining twelve tubes 98 are arranged both circumferentially and radially centrally of the respective channel. The three tubes 98 that pass through wall 71 may appear to interfere with that wall in FIG. 3 because of the scale, but they do not do so and may lie to one side of the wall.

Each of the five tubes of array 341 provides for temperature of the exhaust gas that enters the respective channel 80, 82, 84, 86, 88 to be measured by a respective sensor. Each of the five tubes of array 342 provides for measurement for nitric oxides content of the exhaust gas whose temperature has been measured by the corresponding sensor of array 341 by a respective NOx sensor. Each piece of data from the five sensors of array 341 is transmitted via cable 48 to processor 44, as is each piece of data from the five sensors of array 342 via cable 50. Each of the five tubes of array 343 is used to introduce reductant into the respective channel for entrainment with the respective detached exhaust gas flow headed toward SCR catalyst 30.

The arrangement described defines straight parallel channels which are upstream of SCR catalyst 30, and through which the respective detached exhaust gas streams flow. Each of the ports at which the temperature sensors are disposed have has an opening to the respective channel that lies substantially in a common plane that is transverse to flow through the channels. Each of the ports at which the NOx sensors are disposed has an opening to the respective channel that lies substantially in a common plane that is transverse to flow through the channels and downstream of the temperature sensing ports. Each of the ports through which reductant can be introduced has an opening to the respective channel that lies substantially in a common plane that is transverse to flow through the channels and downstream of the NOx sensors.

The temperature and nitric oxides content data of exhaust gas flowing through each channel are processed in processor 44 according to an algorithm for calculating an appropriate quantity of reductant that should introduced through the respective tube 98 of array 343 to render the subsequent catalytic reaction promoted by SCR 30 effective to reduce the nitric oxides content of the corresponding detached stream to a target level as the stream flows axially through SCR catalyst 30 without contributing to excess ammonia in exhaust gas exiting the SCR catalyst housing.

Because of certain transients, disruptions, or the like, the after-treatment system may on occasion not always reduce the nitric oxides content of the corresponding detached stream to the target level as just described, leaving an unwanted excess of ammonia in the flow leaving SCR catalyst 30. When it is appropriate to remove such excess ammonia, slip catalyst 32 may be employed.

Assembly 36 provides a useful sensing and diagnostic aid both when slip catalyst 32 is and isn't present in an after-treatment system, and both in commercial vehicles and in laboratory testing and development.

Assembly 36 has a construction like assembly 34 in that it comprises a tubular wall of circular cross section that is open at opposite axial ends to which circular annular mounting rings are joined to provide attachment flanges containing threaded through-holes that allow respective axial ends to be attached to the respective housings of the second and third treatment devices by fasteners, and seals that are disposed between end faces of the rings and mating surfaces of the respective treatment device housings to prevent leakage through those joints. The interior cylindrical space comprises a partition wall structure that creates multiple independent parallel channels running lengthwise through assembly 36 downstream of SCR 30. The geometry may be like that of assembly 34, or different.

Assembly 36 accommodates arrays 361, 362 in the same way as arrays 341, 342, 343 are accommodated in assembly 34, with each array 361, 362 comprising a set of tubes 98 whose inner ends are disposed within respective channels to provide for respective sensors of the respective arrays to obtain exhaust gas stream measurements. Sensors in array 361 measure temperature, and sensors in array 362 measure NOx and ammonia content. Each piece of data from the sensors of array 361 is transmitted through the array's tubes 98 and via cable 60 to processor 44, as is each piece of data from the sensors of array 362 via its tubes 98 and cable 62.

The measurements of post-SCR NOx and ammonia content by assembly 36 can be used for analyzing effectiveness of an after-treatment system in the laboratory. They can also provide feedback to processor 44 for closed-loop control of reductant introduction into each channel of assembly 34.

The modified form shown in FIGS. 4 and 5 differs from assembly 34 in that the walled partition structure creates twelve independent parallel channels running lengthwise through the assembly instead of five. The modified structure comprises a closed cylindrical wall 71 of circular cross section concentric with wall 64 whose interior is divided by walls 100, 102, 104, 106 into substantially identical side-by-side sectors of a circle each defining a respective channel through which a respective detached exhaust stream can flow. Halfway between each pair of immediately adjacent walls 72, 74, 76, 78 is an additional radial wall 108, 110, 112, 114 that sub-divides the four arcuate channels into a total of eight.

What is claimed is:

1. An internal combustion engine comprising an exhaust system through which exhaust gas created by combustion in engine combustion chambers passes to atmosphere and which comprises an after-treatment system that treats the exhaust gas before the exhaust gas leaves the exhaust system, wherein the after-treatment system comprises:

an exhaust flow path having an entrance through which exhaust gas enters the after-treatment system and an exit through which exhaust gas exits the after-treatment system;

an SCR catalyst disposed in the exhaust flow path;

partition wall structure that is disposed in the exhaust flow path upstream of the SCR catalyst to define multiple independent channels for separating exhaust gas flowing toward the SCR catalyst into multiple detached exhaust gas flow streams;

for each independent channel, at least one respective data port via which data for at least one characteristic of a respective detached exhaust gas flow stream can be obtained;

for each independent channel, a respective reductant port through which reductant can be introduced into a respective detached exhaust gas flow stream;

a reductant supply system;

and a processor for processing data from at least one data port for each respective independent channel and for using a result of the processing of data from at least one data port for each respective independent channel to cause an appropriate quantity of reductant from the reductant supply system to be introduced into the respective detached exhaust gas flow stream to create a resulting mixture for enabling the SCR catalyst to reduce NOx in the mixture without contributing a significant excess of reductant to flow leaving the SCR catalyst.

2. The engine as set forth in claim 1 in which a respective data port for each respective independent channel comprises a respective temperature sensor for providing temperature data for the respective detached exhaust gas flow stream.

3. The engine as set forth in claim 1 in which a respective data port for each respective independent channel comprises a respective NOx sensor for providing NOx data for the respective detached exhaust gas flow stream.

4. The engine as set forth in claim 1 in which a respective first data port for each respective independent channel comprises a respective temperature sensor for providing temperature data for the respective detached exhaust gas flow stream and a respective second data port for each respective independent channel comprises a respective NOx sensor for providing NOx data for the respective detached exhaust gas flow stream.

5. The engine as set forth in claim 4 wherein each NOx sensor is disposed downstream of the respective temperature sensor for the same detached exhaust gas flow stream.

6. The engine as set forth in claim 5 wherein the respective reductant port through which reductant can be introduced into a respective detached exhaust gas flow stream is disposed downstream of the respective NOx sensor for the same detached exhaust gas flow stream.

7. The engine as set forth in claim 6 wherein the partition wall structure comprises walls that define the independent channels as straight parallel independent channels through which the respective detached exhaust gas streams flow, each of the data ports which comprises a temperature sensor has an opening to the respective independent channel that lies substantially in a common first plane that is transverse to exhaust gas flow through the independent channels, each of the data ports which comprises a NOx sensor has an opening to the respective independent channel that lies substantially in a common second plane that is transverse to exhaust gas flow through the independent channels, and each of the reductant ports through which reductant can be introduced into a respective detached exhaust gas flow stream has an opening to the respective independent channel that lies substantially in a common third plane that is transverse to exhaust gas flow through the independent channels.

8. The engine as set forth in claim 7 wherein the independent channels have substantially equal transverse cross sectional areas along their lengths.

9. The engine as set forth in claim 8 wherein the partition wall structure comprises a central wall defining a central cylindrical independent channel through which one detached exhaust gas stream can flow and other walls defining a succession of arcuate independent channels which circumferentially surround the central wall and through each of which a respective detached exhaust gas stream can flow.

10. The engine as set forth in claim 8 wherein the partition wall structure comprises a central zone containing walls that divide the central zone into side-by-side sectors of a circle each defining a respective independent channel through which a respective detached exhaust gas stream can flow and other walls defining a succession of arcuate independent channels which circumferentially surround the central zone and through each of which a respective detached exhaust gas stream can flow.

11. The engine as set forth in claim 1 further including downstream partition wall structure defining multiple downstream independent channels disposed in the exhaust flow path downstream of the SCR catalyst for separating exhaust gas flowing away from the SCR catalyst into multiple downstream detached flow streams, and for each downstream independent channel, at least one data port via which data about at least one characteristic of each downstream detached flow stream is provided to the processor, a respective data port for each downstream independent channel comprising a respective sensor for providing data for a characteristic of the respective downstream detached flow stream.

12. An engine exhaust after-treatment device for reducing NOx content in engine exhaust gas comprising:
an exhaust flow path having an entrance through which exhaust gas enters the device and an exit through which exhaust gas exits the device;
an SCR catalyst disposed in the exhaust flow path;
partition wall structure defining multiple independent channels for separating exhaust gas flowing toward the SCR catalyst into multiple detached exhaust gas flow streams;
for each independent channel, at least one respective data port via which data about at least one characteristic of a respective detached exhaust gas flow stream can be obtained;
and for each independent channel, a respective reductant port through which reductant can be introduced into a respective detached exhaust gas flow stream;
a reductant supply system;
and a processor for processing data from each respective data port and for using a result of the processing of data from each respective data port to cause an appropriate quantity of reductant from the reductant supply system to be introduced into the respective detached exhaust gas flow stream to create a resulting mixture for enabling the SCR catalyst to reduce NOx in the mixture without contributing a significant excess of reductant to flow leaving the SCR catalyst.

13. The device as set forth in claim 12 further including downstream partition wall structure defining multiple downstream independent channels disposed in the exhaust flow path downstream of the SCR catalyst for separating exhaust gas flowing away from the SCR catalyst into multiple downstream detached flow streams, and for each downstream independent channel, at least one data port via which data for at least one characteristic of each downstream detached flow stream is provided to the processor, a respective data port for each downstream independent channel comprising a respective sensor for providing data for a characteristic of the respective downstream detached flow stream.

14. The device as set forth in claim 13 wherein the at least one data port via which data for at least one characteristic of each downstream detached flow stream can be obtained comprises a temperature sensor for providing temperature data for the respective downstream detached flow stream, a NOx sensor for providing NOx data for the respective downstream detached flow stream, and an ammonia sensor for providing ammonia data for the respective downstream detached flow stream.

15. A method for treating exhaust gas flowing through an exhaust system of an internal combustion engine which comprises an SCR catalyst disposed in an exhaust flow path, the method comprising:
causing exhaust gas flowing in the exhaust flow path toward the SCR catalyst to separate into multiple upstream detached exhaust gas flow streams;
obtaining data for at least one characteristic of each respective upstream detached exhaust gas flow stream;
causing exhaust gas flowing in the exhaust flow path away from the SCR catalyst to separate into multiple downstream detached exhaust gas flow streams;
obtaining data for a characteristic of each downstream detached exhaust gas flow stream via a respective data port at a respective downstream detached exhaust gas flow stream;
and controlling introduction of reductant into each upstream detached exhaust gas flow stream by processing data obtained for at least one characteristic of the respective upstream detached exhaust gas flow stream and data obtained for a characteristic of a downstream detached exhaust gas flow stream via a respective data port at a respective downstream detached exhaust gas flow stream.

16. The method as set forth in claim 15 wherein the step of obtaining data for a characteristic of each downstream detached exhaust gas flow stream comprises obtaining one of ammonia data, temperature data and NOx data for a respective downstream detached exhaust gas flow stream.

17. The engine as set forth in claim 11 in which a sensor for providing data for a characteristic of a respective downstream detached exhaust gas flow stream comprises a NOx sensor for providing NOx data for a respective downstream detached exhaust gas flow stream.

18. The engine as set forth in claim 11 in which a sensor for providing data for a characteristic of a respective downstream detached flow stream comprises a temperature sensor for providing temperature data for a respective downstream detached flow stream.

19. The engine as set forth in claim 11 in which a sensor for providing data for a characteristic of a respective downstream detached flow stream comprises an ammonia sensor for providing ammonia data for a respective downstream detached flow stream.

* * * * *